J. A. ULLMAN.
STILL.
APPLICATION FILED DEC. 23, 1913.
1,113,515. Patented Oct. 13, 1914.
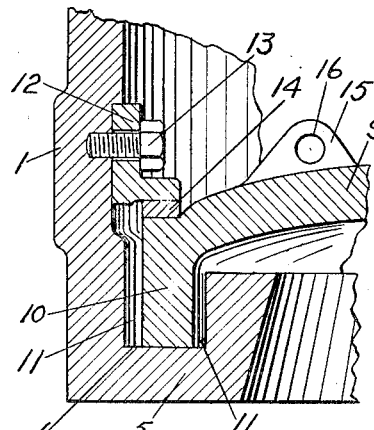
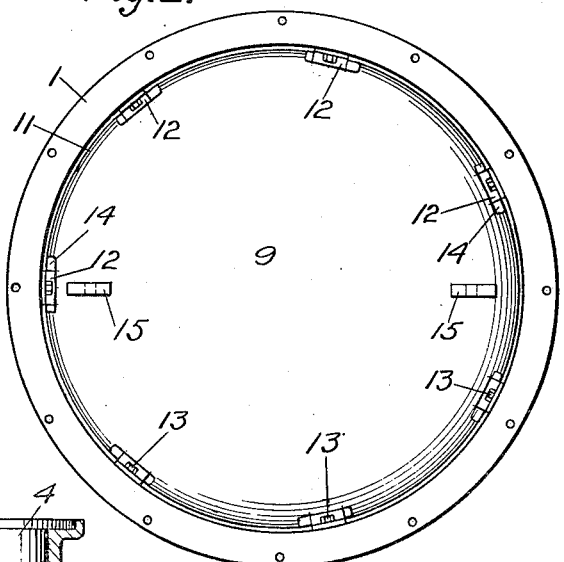
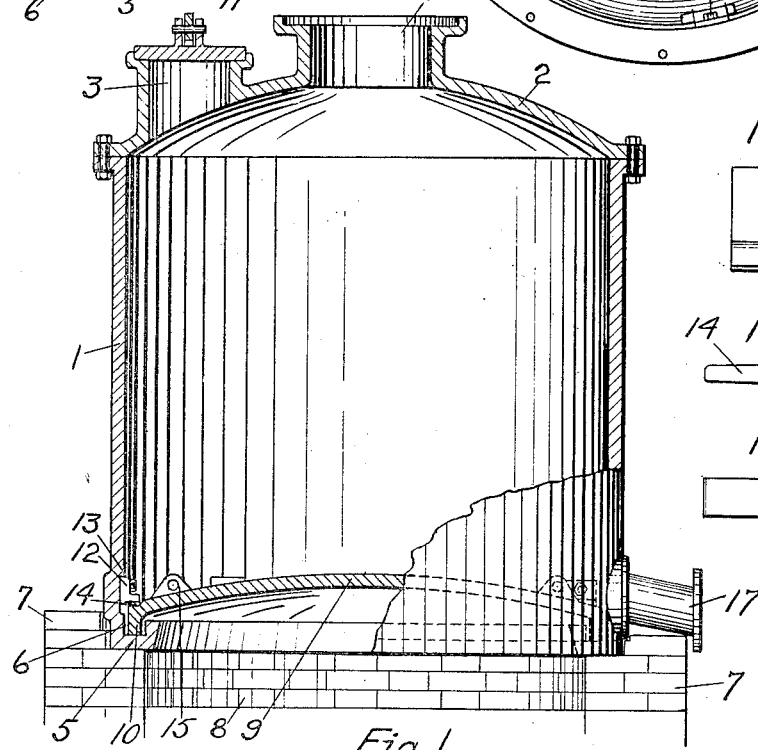
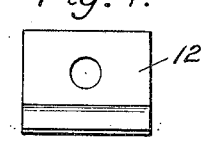
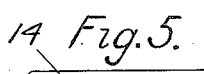
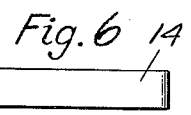
WITNESSES:
Harry E. McGill.
Teresa T. Lynch.
INVENTOR
James A. Ullman
BY
Axel V. Beeken
ATTORNEY

UNITED STATES PATENT OFFICE.

JAMES A. ULLMAN, OF NEW YORK, N. Y.

STILL.

1,113,515.  Specification of Letters Patent.  Patented Oct. 13, 1914.

Application filed December 23, 1913. Serial No. 808,336.

*To all whom it may concern:*

Be it known that I, JAMES A. ULLMAN, a citizen of the United States, and a resident of New York, in the county of New York and State of New York, have invented certain new and useful Improvements in Stills, of which the following is a specification.

The present invention relates to vessels employed for the distillation, melting or other treatment of substances by the application of a direct flame, and has for its main object the production of a vessel the bottom of which is removable without disturbing the vessel with relation to the brickwork or other supporting structure on which the vessel rests.

The invention comprises the features of construction hereinafter set forth and pointed out in the claims.

In the accompanying drawings the invention is shown in a concrete and preferred form, but changes of construction may be made without departing from the invention as expressed in the appended claims.

In the said drawings: Figure 1 is a general view of a vessel and supporting structure therefor, broken away and in section. Fig. 2 is a top plan view of the vessel with the cover removed. Fig. 3 is a detail sectional view of one corner of Fig. 1. Fig. 4 is a detail view of one of the abutment members. Figs. 5 and 6 are side and plan views of one of the wedges used to secure the bottom in position.

Similar characters of reference indicate corresponding parts in the several views.

1 indicates a casing of any suitable material such as cast iron, steel, copper or earthen ware, here shown as being circular in cross section, and having a removable top 2 provided with a filling opening 3 and a flue 4 for the exit of the products of distillation.

Adjacent to the lower end of the casing and preferably integral therewith is a supporting member 5 here shown as an interior circumferential flange having a groove 6. The flange 5 rests on the brickwork or other supporting structure 7 and sustains the weight of the casing. The supporting structure 7 is provided with a fuel or heating chamber 8.

9 is a bottom of smaller size or diameter than the interior of the casing. This bottom is supported wholly within the casing and by means wholly within the exterior of the casing. This bottom is provided with a downwardly projecting circumferential flange 10 which rests in the groove 6 of the supporting member. The flange 10 is smaller in size than said groove 6 so as to leave channels 11 on both sides thereof so as to permit of calking both from the interior and exterior of the casing. The bottom also curves upwardly from the edge thereof toward the center so as to permit of access to said channels 11.

Instead of having through-bolts in the casing for the securing of the bottom thereto, there are removable abutment members 12 above the bottom and fastened to the interior of the casing by means of bolts 13 which do not pass through the casing. This prevents leakage.

14 indicates wedges which are driven in between the bottom 9 and the abutment members 12 to clamp the bottom to the casing or to the supporting member carried thereby.

It will be observed that by the foregoing means the bottom may be removed through the top of the casing without disturbing the latter with respect to the brick-work 7. Preferably lugs 15 having eyes 16 are secured to the bottom into which hooks fastened to chains may be inserted to facilitate the removal of the bottom upwardly out through the casing.

17 is a discharge spout for the casing.

What is claimed, is:

1. The combination of a casing having an interior supporting member provided with a groove, a bottom having a downwardly projecting flange resting in said groove of smaller size than the groove so as to leave channels on both sides thereof, said bottom curving upwardly from said flange to permit access to one of said channels from the exterior of the casing, and means for clamping the bottom to the casing.

2. A still comprising a casing having the lower end thereof inturned to form an inwardly projecting flange having a groove formed in its upper face, a bottom provided with a downwardly projecting flange adapted to rest in said groove and removable through the tops of the casing, removable abutments carried by the casing, and means to be interposed between said bottom and said abutments for securing the bottom in place.

3. In combination, a casing, an inwardly projecting flange formed integrally on the lower end of the casing and formed with a groove in the upper face thereof, a rigid bottom for the casing and removable through the top of the casing, a downwardly projecting flange formed on said bottom and adapted to rest in said groove, securing means within the casing for removably holding the bottom in position, and hook engaging means formed on the inner face of the bottom to facilitate the removal of the bottom from the casing.

4. In combination, a casing, a flange formed by the lower end of said casing and extended inwardly and formed with a groove in the upper face thereof, a bottom for the casing, a flange formed on the edge of said bottom and adapted to rest within the groove to support the bottom in place, means within the casing for removably holding the bottom in position, said bottom having a concaved under face to permit access to the groove from the exterior of the casing when the bottom is in position.

Signed at New York in the county of New York and State of New York this 18th day of December A. D. 1913.

JAMES A. ULLMAN.

Witnesses:
HAROLD A. SMITH,
ALBERT NATHAN.